United States Patent
Oda et al.

(10) Patent No.: US 7,474,939 B2
(45) Date of Patent: Jan. 6, 2009

(54) OBJECT TAKING-OUT APPARATUS

(75) Inventors: Masaru Oda, Yamanashi (JP);
Toshinari Tamura, Gotenba (JP)

(73) Assignee: Fanuc Ltd, Yamanashi (JP)

( * ) Notice: Subject to any disclaimer, the term of this patent is extended or adjusted under 35 U.S.C. 154(b) by 611 days.

(21) Appl. No.: 10/767,193

(22) Filed: Jan. 30, 2004

(65) Prior Publication Data

US 2004/0186624 A1    Sep. 23, 2004

(30) Foreign Application Priority Data

Jan. 30, 2003    (JP)    ............................. 2003-022373

(51) Int. Cl.
*G06F 19/00* (2006.01)

(52) U.S. Cl. .................. 700/245; 700/250; 700/259; 382/153; 623/60; 623/61; 623/64; 414/589; 414/591; 414/730; 414/744.1; 414/749.1

(58) Field of Classification Search ............... 700/245, 700/259, 250; 382/153; 623/60, 61, 64; 294/86; 414/589, 591, 730, 744.1, 749.1, 414/754

See application file for complete search history.

(56) References Cited

U.S. PATENT DOCUMENTS

| | | | | |
|---|---|---|---|---|
| 4,402,053 A | * | 8/1983 | Kelley et al. ................ | 700/259 |
| 4,412,293 A | * | 10/1983 | Kelley et al. ................ | 700/259 |
| 4,613,269 A | * | 9/1986 | Wilder et al. ............... | 700/259 |
| 4,707,647 A | * | 11/1987 | Coldren et al. .............. | 382/151 |
| 4,731,853 A | * | 3/1988 | Hata et al. .................. | 382/153 |
| 4,753,569 A | * | 6/1988 | Pryor ........................ | 700/250 |
| 4,766,322 A | * | 8/1988 | Hashimoto ............. | 250/559.33 |
| 4,816,733 A | * | 3/1989 | Sakakibara et al. .... | 318/568.22 |
| 4,831,547 A | * | 5/1989 | Ishiguro et al. ............. | 700/247 |
| 4,975,016 A | * | 12/1990 | Pellenc et al. ............... | 414/501 |
| 4,985,846 A | * | 1/1991 | Fallon ........................ | 382/153 |
| 5,177,563 A | * | 1/1993 | Everett et al. ............... | 356/621 |

(Continued)

FOREIGN PATENT DOCUMENTS

EP    1 256 860    11/2002

(Continued)

OTHER PUBLICATIONS

Japanese Office Action (Notice of Grounds for Rejection) dated Jul. 12, 2005 in corresponding Japanese Application 022373/2003.

(Continued)

*Primary Examiner*—Thomas G Black
*Assistant Examiner*—Wae Louie
(74) *Attorney, Agent, or Firm*—Staas & Halsey LLP

(57) ABSTRACT

An object taking-out apparatus for taking out objects randomly stacked in a container according to a condition of how each object is placed, which includes a robot hand having telescopic means and a coupling member whose one ends are connected to a robot arm end, and holding means coupled to their other ends. The telescopic means expands and contracts to cause the holding means to assume either a first orientation where a small angle is formed or a second orientation where a large angle is formed between a holding direction axis of the holding means and a rotary axis of the robot arm end, thereby taking out objects without causing interaction between the robot and the container.

9 Claims, 7 Drawing Sheets

U.S. PATENT DOCUMENTS

| | | | | |
|---|---|---|---|---|
| 5,219,264 | A * | 6/1993 | McClure et al. | 414/730 |
| 5,308,221 | A * | 5/1994 | Shimokoshi et al. | 414/734 |
| 5,321,353 | A * | 6/1994 | Furness | 318/568.11 |
| 5,471,541 | A * | 11/1995 | Burtnyk et al. | 382/153 |
| 5,513,299 | A * | 4/1996 | Terasaki et al. | 700/255 |
| 5,608,847 | A * | 3/1997 | Pryor | 700/248 |
| 5,636,039 | A * | 6/1997 | Tanno et al. | 358/474 |
| 5,642,468 | A * | 6/1997 | Lee et al. | 700/262 |
| 5,740,329 | A * | 4/1998 | Lee et al. | 700/262 |
| 5,751,610 | A * | 5/1998 | Gan et al. | 700/85 |
| 5,825,980 | A * | 10/1998 | Danmoto et al. | 700/245 |
| 5,838,882 | A * | 11/1998 | Gan et al. | 700/259 |
| 5,944,476 | A * | 8/1999 | Bacchi et al. | 414/783 |
| 6,597,971 | B2 * | 7/2003 | Kanno | 700/245 |
| 7,244,093 | B2 * | 7/2007 | Watanabe et al. | 414/806 |
| 7,313,464 | B1 * | 12/2007 | Perreault et al. | 700/245 |
| 2004/0186624 | A1 * | 9/2004 | Oda et al. | 700/245 |

FOREIGN PATENT DOCUMENTS

| | | |
|---|---|---|
| JP | 59-183389 | 6/1984 |
| JP | 07116984 | 5/1995 |
| JP | 7-319525 | 12/1995 |
| JP | 11123681 | 5/1999 |
| JP | 11129179 | 5/1999 |
| JP | 2002-200588 | 7/2002 |
| JP | 2002-331480 | 11/2002 |

OTHER PUBLICATIONS

European Search Report in corresponding Patent Application No. 04250500.8-2316 dated Aug. 16, 2006.

* cited by examiner

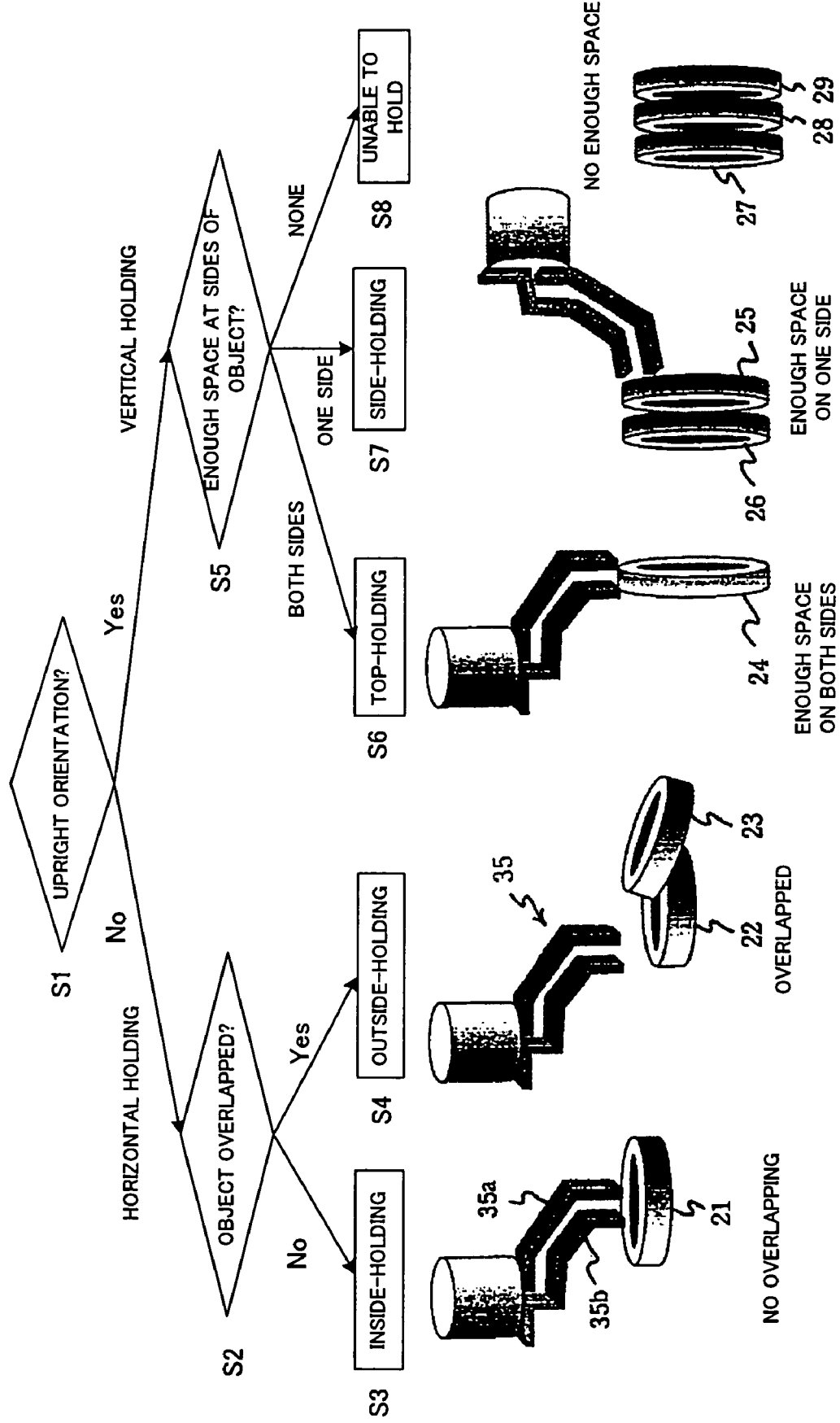

OBJECT TAKING-OUT APPARATUS

BACKGROUND OF THE INVENTION

1. Field of the Invention

The present invention relates to an object taking-out apparatus for taking out an object using a robot hand, and more particularly, to an object taking-out apparatus provided with object holding means whose orientation is changeable according to condition placement of an object.

2. Description of Related Art

Recently, robots have been made more intelligent to perform operations on objects. For example, an operation of taking out objects randomly stacked in a container or on a pallet is a typical application of a robot having a hand attached to an arm end. For taking out the objects randomly stacked and not subjected to positioning, the position/orientation of each individual object is detected by means of a visual sensor or the like, and according to the detected result, the operating position/orientation of the robot is determined before taking out objects.

In taking out objects randomly stacked in a container, both the robot arm and the robot hand should not interfere with the container. This usually imposes limitations on taking out of objects. Specifically, objects that can be taken out without causing interaction are limited to those adequately spaced away from the peripheral wall of the container and not tilting toward the container wall. These requirements make it difficult to remove all the objects from the container.

To avoid the interaction problem, an interaction avoiding apparatus is proposed for example in JP 2002-331480A, which operates to actively change the orientation of the robot arm and the rotary position of the robot wrist, so that they do not enter a preset interaction region, thereby avoiding the interaction between the container and the robot arm or hand. However, this kind of prior art still cannot remove objects placed near or tilting toward the container wall and objects surrounded by other objects highly stacked around them.

SUMMARY OF THE INVENTION

The present invention provides an object taking-out apparatus capable of positively eliminating the interaction problem to thereby greatly reduce restriction on a placement condition of an object to be taken out.

According an aspect of the present invention, an object taking-out apparatus comprises a hand attached to a distal end of a robot arm and having holding means for holding an object; and orientation changing means provided at the hand, for changing orientation of the holding means to selectively take one of a plurality of orientations including a first orientation and a second orientation different from each other in accordance with a command from a robot controller.

In this invention, the orientation of the holding means attached to the distal end of the robot arm is changed according to the position/orientation of an object to be taken out, presence of overlapping with another object, positional relation with the container wall, or the like, so as to alleviate object taking-out requirements, thus avoiding a condition in which an object is unable to be taken out.

It is preferable that the first orientation is set such that a direction of a holding axis of the holding means is closest to a direction of a rotational axis of the distal end of the robot arm in the plurality of orientations to form a predetermined angle not equal to zero degree, e.g. equal to or less than 45 degrees, between the direction of the holding axis and the direction of the rotational axis of the distal end of the robot arm.

Preferably, the holding means has a center of holding offset from a center axis of a proximal portion thereof. With this arrangement, objects even placed near the container wall can be held, without moving the hand to bring the center of the proximal portion of the hand close to the container wall. If the center of holding is not offset, the hand must be moved so that the center axis of the proximal portion coincides with the center axis of the object to be taken out, resulting in a fear of the hand to interfere with the container wall, if a condition of the distance between the object center and the container wall being larger than the interaction radius of the hand is not satisfied.

In taking out an object tilting toward the container wall, the holding means of the hand is caused to assume the position where the predetermined angle is formed between a holding axis of the holding means and a rotational axis of the distal end of the robot arm, whereby the necessity of bringing the hand close to the container wall is eliminated to avoid the interaction therebetween. The predetermined angle may be an angle close to zero degree, if the object inclination is small.

Next, as for the second orientation that can be assumed by the holding means, it is preferable that the second orientation be set to form an angle substantially equal to 90 degrees between the holding axis and the rotational axis of the robot arm end. Even if most part of a space in the vicinity of the object to be taken out is occupied by other objects, the holding means assuming the second orientation can access to the object to be taken out through unoccupied part of the vicinity space and hold that object without causing interaction with other objects.

The object taking-out apparatus may be provided with a visual sensor having means for storing taught image models of an object as seen from different directions, and means for comparing a captured image of the object with the taught image models and for selecting one of the taught image models according to a degree of conformity. With use of this kind of visual sensor, the orientation changing means can change the orientation of the holding means according to the selected taught image model before the object is held.

A condition of how objects overlap one another may be detected by use of a visual sensor, and a held position of the object by the holding means may be changed according to the detected condition.

The use of visual sensor is effective especially when the object to be taken out partly overlaps another object. Specifically, the object partly overlapping another object can be held without causing interaction, by holding that part of the object which is specified in advance by the visual sensor as being able to be held.

The visual sensor may have image capturing means attached to the robot arm end through a slider mechanism that is movable in directions away from and toward the robot arm end. The image capturing means is moved in the direction away from the robot arm end at a time of image capturing, and moved in the direction toward the robot arm end at a time of the object being held, whereby the fear of causing interaction can be reduced.

Specifically, if the object to be taken out is surrounded by highly stacked other objects, the visual sensor must be brought close to that object in order to take an accurate image thereof, and thus the fear of causing interaction between the hand and the highly stacked objects increases. In this invention, only the image capturing means attached to the slider mechanism can be moved in the direction away from the robot arm end at the time of image capturing, thereby preventing the interaction. At the time of holding the object, the image capturing means can be retreated in the opposite direction, thereby preventing the image capturing from hindering the holding of the object.

As described above, this invention makes it possible to remove objects irrespective of what conditions they are placed in, while preventing the interaction between the hand and the container wall and between the visual sensor and objects other than the object to be taken out. Specifically, the orientation of the holding means can be changed according to the position/orientation of the object to be taken out, the positional relation between the object and the container wall, the inclination of the object, the overlapping between the object and other objects, etc., whereby the object taking-out apparatus can flexibly deal with various conditions in which objects are placed. Thus, the efficiency and cost effectiveness of object taking-out can be improved. The problem of object taking-out being limited due to the interaction between the hand and the container and between the visual sensor and objects can be eliminated, and as a result, damages to the hand, visual sensor, objects, etc. can also be prevented.

Since there is no fear that the position/orientation of the image capturing means is dislocated due to the interaction, the object taking out operation can be made without interruption for recalibration of the image capturing means to correct the dislocation.

BRIEF DESCRIPTION OF THE DRAWINGS

FIG. 7 is a view showing by way of example a flowchart of procedures for selecting a way of object holding according to results of image capturing and three-dimensional visual measurement, together with a relation between conditions of objects and ways of holding.

DETAILED DESCRIPTION

With reference to the appended drawings, an object taking-out apparatus according to an embodiment of the present invention will be explained.

Figure 1:
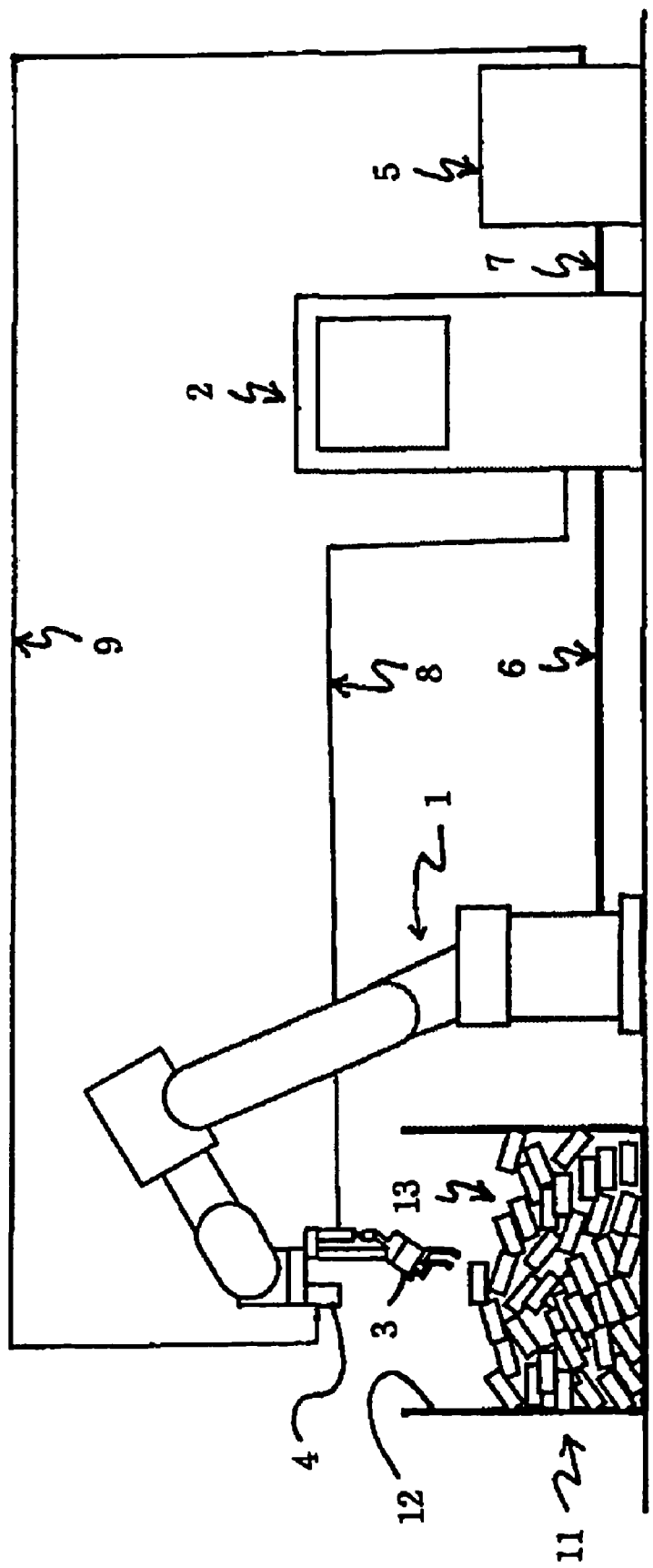
FIG. 1 is a view showing the overall arrangement of an object taking-out apparatus according to an embodiment of this invention.

In FIG. 1, reference numeral 1 denotes a vertical articulated robot (hereinafter simply referred to as robot) connected via cables 6 to a robot controller 2 for controlling the operation of the robot 1. The robot 1 has an arm having a distal end thereof mounted with a hand 3 and a three dimensional visual sensor. This visual sensor has a sensor head which includes image capturing means and which will be referred to as image capturing means 4. The hand 3 is provided with holding mechanism (serving as object holding means), mentioned later, which is controlled by the robot controller 2. Control signals and electric power are supplied to the hand 3 through cables 8 extending between the robot hand and the robot controller 2.

The three dimensional visual sensor may be for example a conventional one that is a combination of a light projector for irradiating patterned light such as slit light or spot light and a CCD video camera (serving as image capturing means) for detecting reflected light. The CCD video camera may also be used for ordinary picture taking to obtain a two-dimensional image without light projection.

The image capturing means (sensor head) 4 of the three dimensional visual sensor is connected through cables 9 to a control processor 5 for the visual sensor. The control processor 5, which may be for example a personal computer, comprises hardware and software for controlling sensing operations (light projection, image capturing, etc.) of the visual sensor, and for processing photodetection signals (video image signals) obtained by the sensing (including ordinary picture-taking), and for transmitting, as mentioned later, the desired information to the robot controller 2 through a LAN network 7.

In this embodiment, a large number of objects 13 to be taken out by the robot hand 3 are received and randomly stacked in a basket-like container 11 placed near the robot 1. The container 11 may be one having a peripheral wall 12 that defines an upper opening which is rectangular in cross section, however in general, the container shape is not limited thereto.

The construction and functions of the hand 3, which are primary features of this invention, will be described with reference to FIGS. 2a and 2b.

Figure 2B:
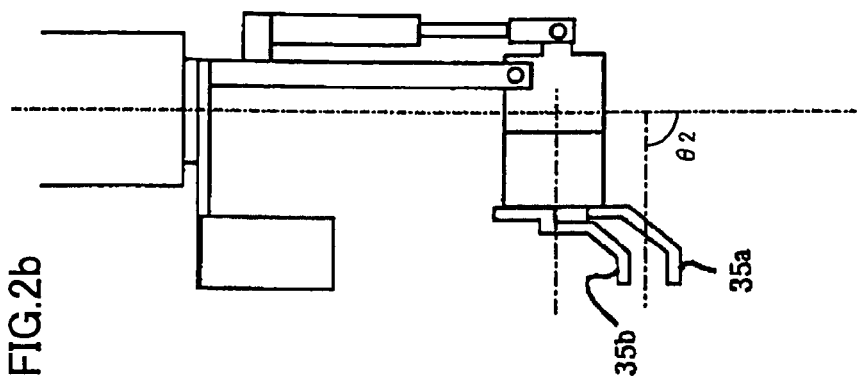
FIG. 2b is a view showing the holding mechanism which is in a second orientation.
Figure 2A:
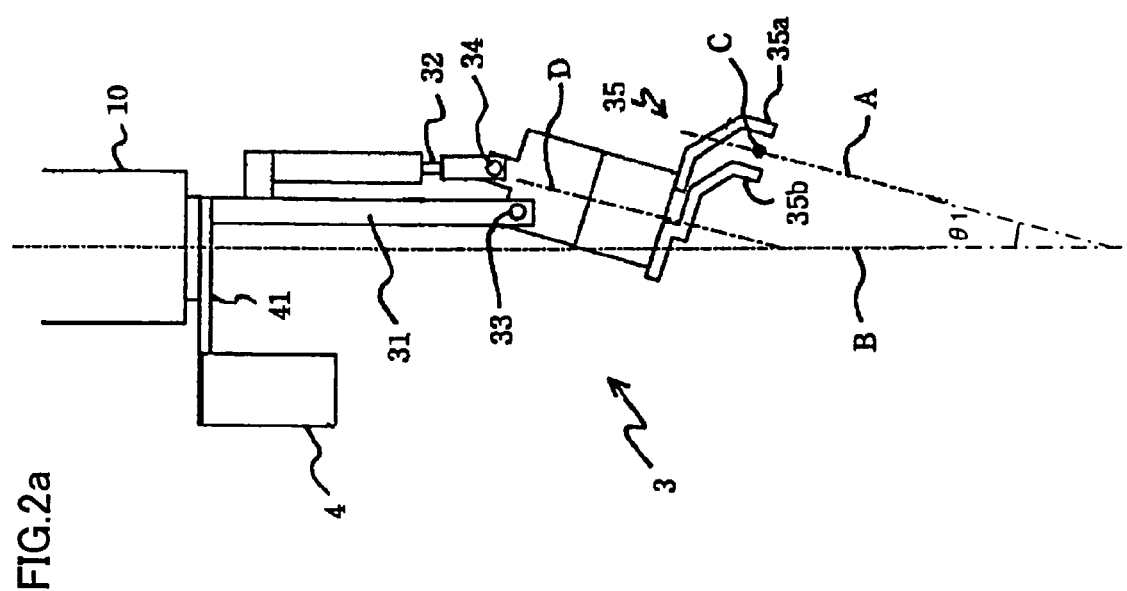
FIG. 2a is a schematic view showing the construction of a hand used in the embodiment, in a state where a holding mechanism of the hand is in a first orientation.

As shown in FIGS. 2a and 2b, the hand 3 is attached through a coupling member 31 to a mount 41 that is mounted to the distal end 10 of the robot arm. In parallel to the coupling member 31, a telescopic mechanism is provided that has telescopic means 32 adapted to be driven for example by a pneumatic cylinder or the like. Holding means (hand body) 35 for griping an object is pivotally supported by rotary supports (pivotal axes) 33, 34 that are individually provided near distal ends of the coupling member 31 and the telescopic means 32.

The holding means 35 may be in forms of such as a chuck having closing pawls for holding an object, a vacuum or magnetic suction pad for sucking an object. The type of holding means for use is selected in accordance with the shape, material, weight, etc. of the object to be held. In this embodiment, holding means of a type having closing members 35a, 35 is used by way of example. For any type of holding means, electric power and commands for holding operations (such as close command, release command, suction command, suction stop command, etc.) are supplied from the robot controller 2 to the holding means.

In the embodiment, with expansion and contraction of telescopic means 32, the holding means 35 rotates around the rotary support 33 where it is coupled to the coupling member 31, to thereby change its orientation. The telescopic means 32 has a plurality of expansion-contraction positions which are set beforehand and between which a changeover is made in accordance with a command from the robot controller 2. The expansion-contraction positions include one where the holding means 35 assumes a first orientation shown in FIG. 2a and another one where it assumes a second orientation shown in FIG. 2b.

In the first orientation, a predetermined angle θ1, not equal to zero, is formed between a holding axis A of the holding means 35 and a rotational axis B of the distal end 10 of the robot arm. Hereinafter, the angle formed between these two axes A, B will be referred to as holding angle, and holding angles corresponding to the first and the second orientations will be referred to as first and second holding angles, respectively.

Typically, the first holding angle is set to be larger than zero degree (for example, equal to or larger than 10 degrees) and less than or equal to 45 degrees. This setting is intended for convenience of taking-out of an object disposed in the container 11 to tilt toward the container wall 12, as will be described with reference also to FIG. 3.

Figure 3:
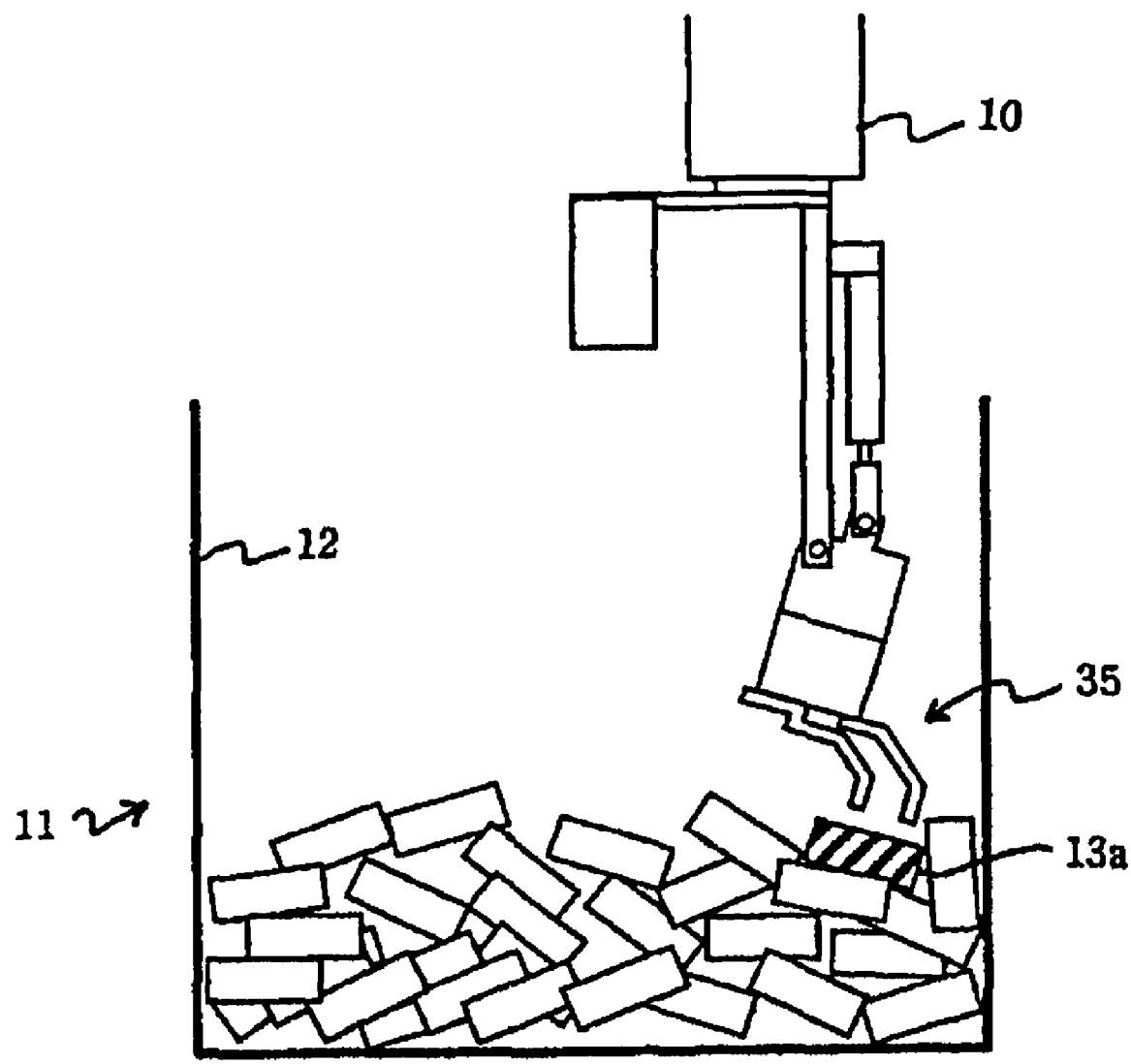
FIG. 3 is a view showing an orientation of the hand for holding an object tilting toward a container wall.

As shown in FIG. 3, when the first holding angle is set to be larger than zero degree, an object 13a tilting toward the container wall 12 can be held and taken out from the container without causing interaction. When the first holding angle is zero, the normal line to the top surface of the object 13a coincides with the axis of the robot arm end, and if the object 13a to be taken out is disposed near the container wall 12 so that the normal line to the object 13a crosses the container wall 12, especially a lower part of the wall, there is a great fear that the robot hand 3 or the robot arm moving along its axis or the normal line to the object 13a interferes with the container wall 12 except for a case where the tilting angle of the object 13a is small.

In the second orientation shown in FIG. 2b, the holding angle (an angle θ2 formed between the holding direction axis of the holding means 35 and the axis of the robot arm end 10) is about 90 degrees. With this setting of the second orientation, the holding means 35 of the robot hand 3 can access an object, which is to be taken out, from a direction in which no object is present in a space near the object to be taken out, and can hold the object without causing interaction with other objects.

Figure 4:
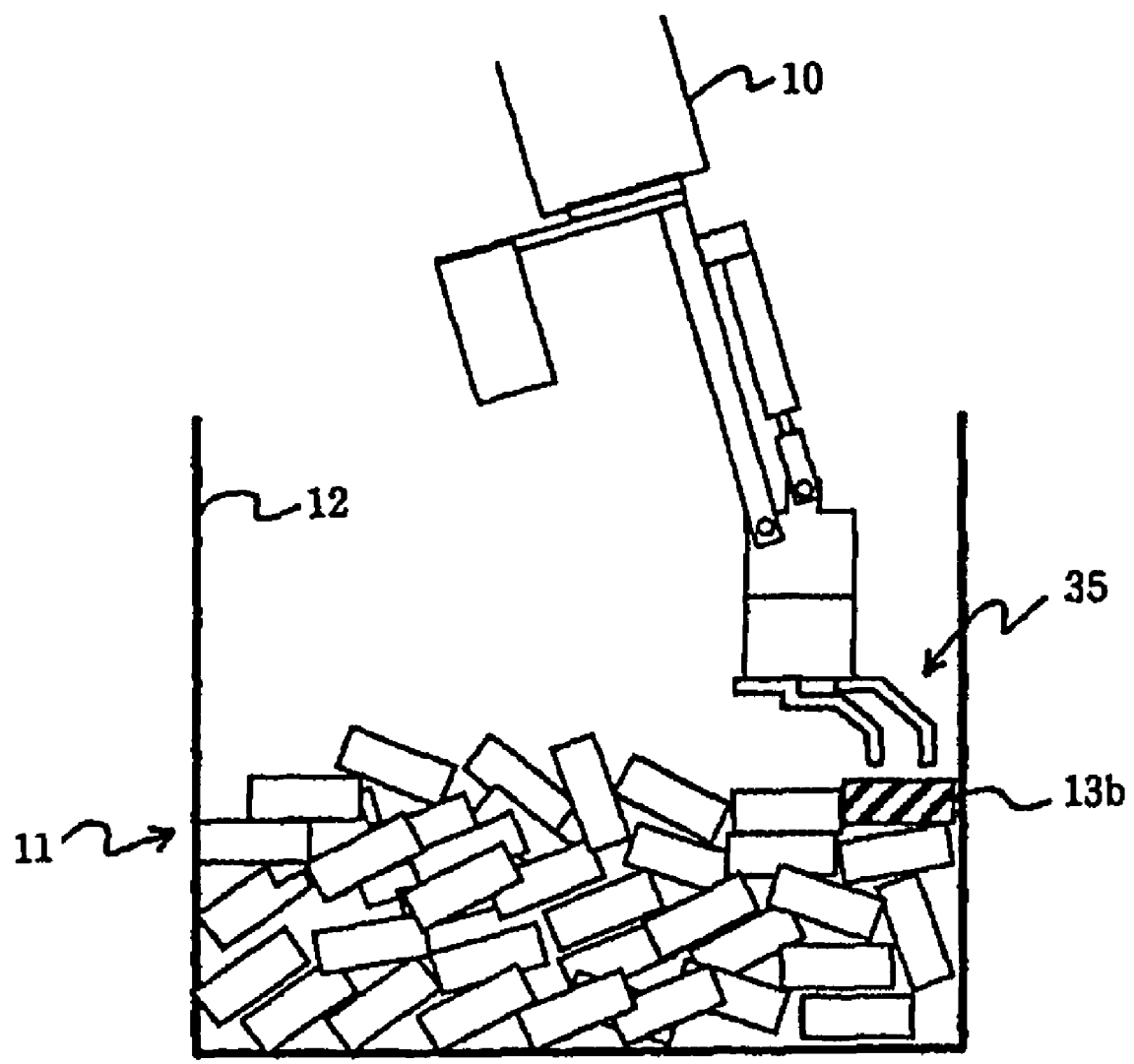
FIG. 4 is a view showing an orientation of the hand for holding an object located near the container wall.

To allow the visual sensor to capture the image of an object in order to determine the position or orientation thereof, the image capturing means 4 of the visual sensor must be brought close to the object. On this occasion, the holding means 35 can assume the second orientation so as to avoid interaction with objects. As shown in FIG. 2a, moreover, the holding means 35 of the hand 3 is configured such that its holding center C is located offset from the center axis D of a proximal portion of the hand 3. This eliminates the necessity of causing the center axis of the proximal portion of the hand to coincide with that of the object at the time of object taking-out, making it possible to allow the hand to assume such a position where the proximal portion of the hand is located offset inwardly of the container, as shown in FIG. 4 in which reference numeral 13b denotes an object to be taken out using the holding means 35 and located close to the peripheral wall 12 of the container.

In the hand 3 having the construction shown in FIG. 3, the image capturing means (which may include a light projector) 4 is fixedly mounted to the mount 41 at the robot arm end 10. Thus, the positional relation between the holding means 35 and the image capturing means 4 is kept unchanged, except for changes in orientation of the holding means 35. With this arrangement, when the image capturing means 4 is moved close to an object whose image is to be captured, the hand 3 is automatically moved close to the object, and when the holding means 35 is moved to an object to be held, the image capturing means 4 is automatically moved close to the object. This increases the fear of causing interaction between the hand and surroundings such as objects. On the other hand, in general, it is unnecessary to move the holding means close to the object at the time of the image capturing, and to move the image capturing means close to the object at the time of the holding the same.

Figure 5:
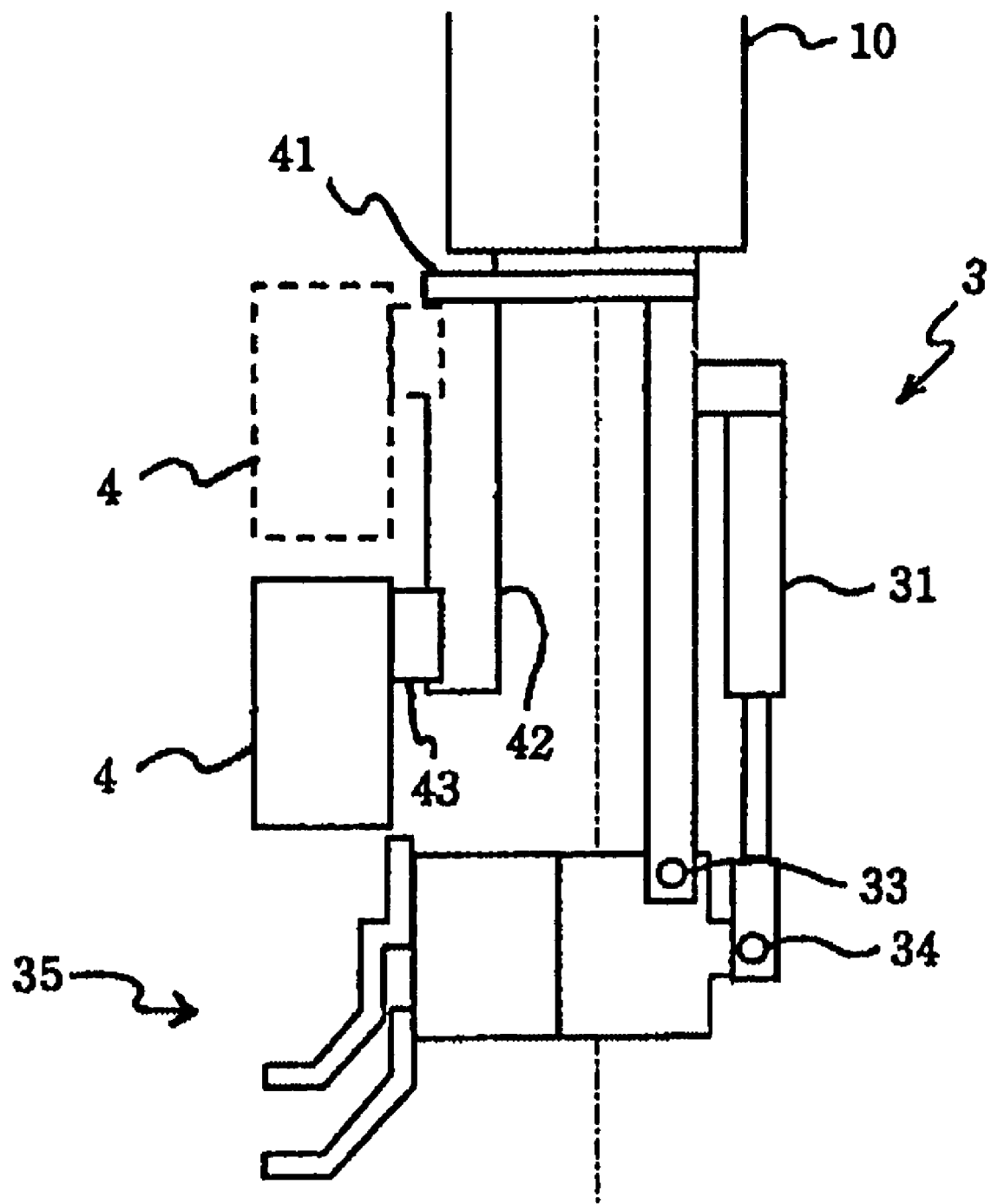
FIG. 5 is a schematic view of a hand having a visual sensor whose image capturing means is arranged to be movable.

In this regard, the present invention proposes not only the aforementioned hand construction, but also a slide mechanism for moving the image capturing means between the distal end and the proximal end of the hand. FIG. 5 shows an example of the hand construction having such a slide mechanism, in which the image capturing means 4 of the visual sensor is not fixedly mounted to the mount 41 at the robot arm end 10, but mounted thereto through a slider mechanism 42 for moving the image capturing means 4 in a direction parallel to the axis of the robot arm end 10.

Reference numeral 43 denotes a carrier for the image capturing means 4. The carrier 43 is arranged to be movable on the slider mechanism 42, thus making the image capturing means 4 movable. Although an illustration is omitted, the slider mechanism 42 is connected to the robot controller 2, so that the position of the carrier 43, and by extension the position (slide position) of the image capturing means 4, is controlled in accordance with a command supplied from the robot controller 2.

This makes it possible to slide, where required, the image capturing means 4 up to the position closest to the object whose image is to be captured, while suppressing the movement of the hand 3 toward the object to a minimum, thus reducing the fear of interaction of the hand 3 with the surroundings such as objects. On the other hand, when the hand 3 is moved close to the object to be held, the image capturing means 4 is retreated up to the position most remote from the object, thereby suppressing the movement of the image capturing means 4 toward the object to a minimum. When the hand moves toward the object, therefore, the fear of interaction of the image capturing means 4 with the surroundings such as objects can be reduced.

Figure 6:
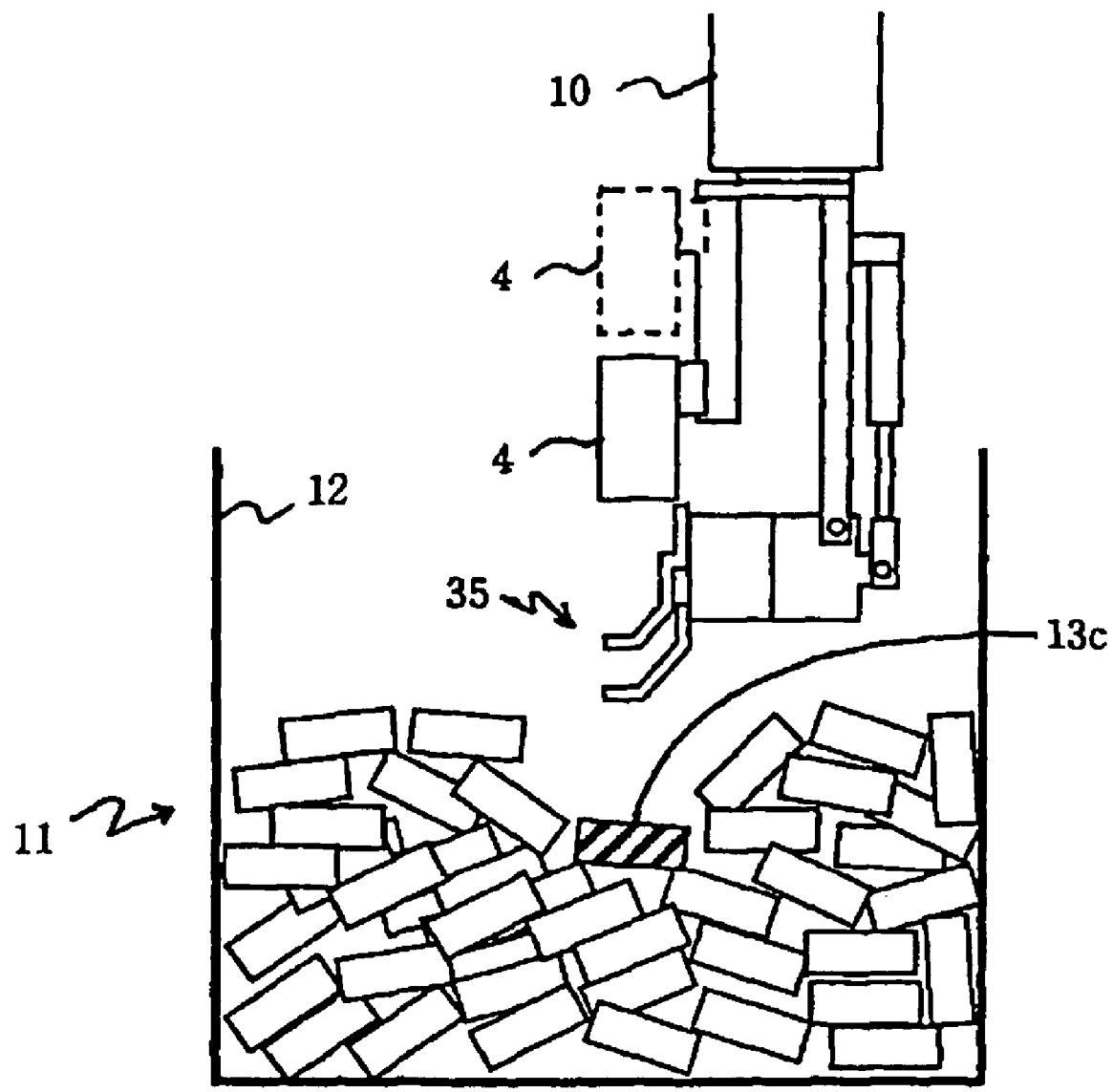
FIG. 6 is a view for explaining how the image of an object surrounded by highly stacked objects is taken and how the object is gripped by means of the hand shown in FIG. 5, without causing interaction between the hand and the stacked objects.

This method for interaction avoidance is effective especially when, as shown in FIG. 6, the object 13c to be subject to the image capturing or the holding is located deeply below the surrounding objects. In FIG. 6, the position, shown by the solid line, of the image capturing means 4 indicates an example of the slide position for capturing the image of the object 13c, whereas the position shown by the dotted line of the image capturing means 4 indicates an example of the slide position for holding the object 13c.

By use of the object taking-out apparatus having the aforementioned constructions and functions, objects 13 in the container 11 are taken out one by one. The following is a typical outline of procedures, after which the objects 13 are taken out by the holding means 35 of the hand 3.

(1) The robot 1 is moved to a first image capturing position which is a position suitable for the robot to cover, with some margin, a distribution area of the objects 13 (the inner area defined by the peripheral wall 12 of the container 11), and which is taught beforehand to the robot controller 2.

(2) At the first image capturing position, an image covering the distribution area of the objects 13 is taken using the image capturing means 4.

(3) Using the control processor 5 for visual sensor, an attempt is made to detect each individual object 13. Various methods for the individual detection of objects are known. In this embodiment, the two-dimensional object image is taught beforehand to the control processor 5, and, using a matching method, one or more objects 13 are found out and a three-dimensional measurement is performed for the individual object detection.

(4) In accordance with appropriate rules, among the detected objects, an object to be taken out at this time is selected. There are known various selection methods, and an appropriate method can be selected according to design specifications. For example, a rule may be used, in which an object located at the highest position is selected with priority. The height of each of the detected objects can be detected by sequentially irradiating slit light on the objects and by making a three-dimensional measurement, for instance. Another rule may be used, in which an object located closest to the center of the container 11 is selected with priority.

(5) In order to obtain detailed information of the object that is about to be taken out at this time and an environmental condition around the same, a second image capturing position is determined. For example, the second capturing position can be determined by correcting a position (three-dimensional position) taught beforehand to the robot controller 2, on the basis of two-dimensional position information of the object that is about to be taken out at this time (which information is obtainable by the image capturing at the first image capturing position, and for height information, taught data is used as it is). Alternatively, the second image capturing position may be determined using three-dimensional position data of the object about to be taken out at this time, out of pieces of such data of the individual objects obtained at procedure (4) while irradiating slit light thereon.

(6) The holding means 35 is caused to assume the second orientation where it is folded in compact, thereby avoiding interaction between objects and the hand 3. The second orientation may also be adopted when the image capturing at procedure (3) is carried out.

(7) In case that the hand shown in FIG. 5 is used, the image capturing means 4 is slid in the direction away from the robot arm end up to the position closest to the object. In this case, this slide position is taken into account for the determination of the second image capturing position at procedure (5). Of course, procedure (7) is omitted in a case where the hand shown in FIGS. 2a and 2b is used.

(8) The robot 1 is caused to move to the second image capturing position. In the case of the hand shown in FIG. 5, the image capturing means 4 is slid in the direction away from the robot arm end up to the position closest to the object, whereby the fear of interaction can be greatly reduced as explained above, even if the object about to be taken out is located deeply below the surrounding objects.

(9) Using the control processor 5, a two-dimensional image is taken of the object about to be taken out and the environmental condition around the same. Then, a three-dimensional measurement of the object and its environment is carried out, while performing irradiation of slit light from the light projector and other operations.

(10) Results of procedure (9) are analyzed by the control processor 5 to judge a condition of the object about to be taken out and its environment, and then a holding mode suited to the judged condition is determined. For the condition judgment, all the conceivable conditions are classified into several cases in advance, and which of these cases the condition in question belongs to is determined. FIG. 7 shows by way of example the classified cases and the main points of judgment processes (flowchart), together with types of the holding either of which is selected according to the judgment result. Here, it is assumed that objects are of annular ring shape (automotive tires, for example).

First, a determination is made as to whether or not the object attempted to be taken out is in an upright orientation (Step S1). For the determination at Step S1, images of an object is taken from different directions using the image capturing means 4, and based on these images, taught image models are prepared beforehand in the control processor 5. The image of the object taken in the second image capturing position is compared with the taught image models, and the taught image model with the highest conformity is selected to determine whether the object is in an upright orientation or not.

If the result of determination at Step S1 is negative (No), whether or not the object attempted to be taken out overlaps another object is determined (Step S2). In this determination, as for objects of annular ring shape, the determination result is affirmative (Yes), if the oval arc profile of the object attempted to be taken out is disconnected by another oval arc profile. If not so, the determination result is negative.

If the result of determination at Step S2 is negative, it is determined that the object attempted to be taken out is in a horizontally oriented orientation and does not overlap another object, as shown by reference numeral 21. As the holding mode suited to the above condition, inside-holding is selected (Step S3), in which the object 21 is held from inside by opening the closing members 35a, 35b (see, FIGS. 2a and 2b) of the holding means 35. Specifically, in the inside-holding, the holding means 35 is moved close to the object 21 from above, and then the closing members 35a, 35b are opened to be brought in urged contact with the inner peripheral surface of the object 21, whereby the object 21 is held.

If the result of determination at Step S2 is affirmative, it is determined that, as shown by reference numeral 22, the object attempted to be taken out overlaps another object 23, and is partly covered by the object 23. As the holding mode suited to this condition, outside-holding is selected (Step S4), in which an arcuate portion of the object 22, not covered by another object 23, is held from both sides by closing the closing members 35a, 35b. Specifically, when the object 22 overlaps another object 23, the holding means 35 is moved close to the object 22 from above, and then the closing members 35a, 35b are closed to be brought in urged contact with the inner and outer peripheral surfaces of the object 22, respectively, whereby the object 22 is held.

On the other hand, if the result of determination at Step S1 is affirmative, whether or not an empty area is present on both sides of the object attempted to be taken out (Step S5). In this determination, as for objects of annular ring shape, it is determined that an empty area is present on both sides (object 24), if a narrow band-shaped profile (representing another upright object) is not detected at a height substantially equal to the height of the object attempted to be taken out. If another upright object 26 is detected on one side, it is determined that an empty area is present on one side (object 25). If other upright objects 27, 29 are detected on both sides, it is determined that no empty area is present (object 28).

As the holding modes suited to these conditions, top-holding, side-holding, and unable to hold are selected, respectively (Steps S6, S7 and S8). The top-holding and the side-holding belong to a so-called vertical holding.

In the top-holding, the holding means 35 is moved close to the object 24 from above, and then the closing members 35a, 35b are closed to be brought in urged contact with both end surfaces of the object 24, respectively, whereby the object 24 is held.

In the side-holding for a case where an empty space is present only on one side of the object 25, the holding means 35 is moved close to the object 25 from lateral side, utilizing the empty space, and then the closing members 35a, 35b are closed to be brought in urged contact with the inner and outer peripheral surfaces of the object 25, respectively, thus holding the object 25.

If the unable to hold condition is determined at Step S8, the object to be taken out at this time is changed to the second best object that can be determined according to the rules in procedure (4). Whereupon, the procedure (5) and subsequent procedures are repeated.

Subsequently, the above procedures are repeated until Step S3, S4, S6, or S7 is reached. If Step S8 is reached for all the objects detected in procedure (3), an alarm is output and the system is caused to stop, though this situation hardly occurs. When the state of unable to hold is detected, other objects are taken out ahead of the same. In general, therefore, there is a high possibility that a space is produced at least one side of the object that was determined as being unable to hold.

(11) In accordance with the decided holding mode, the orientation of the holding means 35 is selectively determined. In case that the holding means moves to the object from above (except for the case of side-holding), the holding means is set to assume the first orientation. If holding means moves to the object from lateral side (in the case of side-holding), it is set to assume the second orientation.

(12) If the hand shown in FIG. 5 is used, the image capturing means 4 is slid (retreated) in the direction toward the robot arm and up to the position most remote from the object. This procedure (12) is of course omitted, when the hand shown in FIGS. 2*a* and 2*b* is used.

(13) In accordance with the position/orientation of the object to be taken out and the decided holding mode, the operating position (robot position) for carrying out the holding operation is determined. Where required, one or more approach points short of the operating point are determined.

(14) The robot 1 is caused to move to the operating position, and the holding is performed, as mentioned above, according to the determined holding mode. In the case of using one or more approach points, the robot 1 is moved by way of the approach point or points to the operating position for holding. The held object is brought to a specified location, and then released from the holding means 35.

(15) After returning to procedure (1), the above procedures are repeated until no object is detected in procedure (3).

In the above, typical embodiments have been explained. However, this invention is not limited to these embodiments. For example, the capturing means of the visual sensor is not necessarily mounted to the robot arm, but may be fixedly provided above the container. This invention is of course applicable to a case where a container having a low-profiled wall, such as tray or pallet is used, and to a case where objects are randomly stacked on a plate, table, floor, or the like.

As for telescopic means for changing the orientation of the holding means of the hand, it may be a telescopic mechanism having an electric motor serving as a drive source, instead of a hydraulic cylinder used in the embodiment. As an alternative to the telescopic mechanism, there may be used a mechanism, having a rotary mechanism provided at one end of a coupling member and driven by an electric motor, for directly rotating the holding means to change the orientation of the same.

What is claimed is:

1. An object taking-out apparatus for taking out an object, using a robot having a robot arm, comprising:
   a hand attached to a distal end of the robot arm and having holding means for holding an object, a center of holding by said holding means being offset from a center axis of a proximal portion thereof;
   orientation changing means provided at said hand, for changing orientation of said holding means to selectively take one of a plurality of orientations including a first orientation and a second orientation different from each another; and
   a visual sensor for detecting a condition of placement of an object, wherein said orientation changing means changes the orientation of said holding means according to the detected condition before holding the object.

2. An object taking-out apparatus according to claim 1, wherein an angle equal to or less than 45 degrees is formed between a direction of a holding axis of said holding means and a rotational axis of the distal end of the robot arm when said holding means takes the first orientation.

3. An object taking-out apparatus according to claim 2, wherein an angle substantially equal to 90 degrees is formed between the direction of the holding axis and the rotational axis of the distal end of the robot arm when said holding means takes the second orientation.

4. An object taking-out apparatus according to claim 1, further comprising a visual sensor having means for storing taught image models of an object as seen from different directions, and means for comparing a captured image of the object with the taught image models and for selecting one of the taught image models according to a degree of conformity, wherein said orientation changing means changes the orientation of said holding means according to the selected taught image model before holing the object.

5. An object taking-out apparatus according to claim 1, further comprising a visual sensor for detecting condition of overlapping of objects, wherein a holding position of the object by said holding means is changed according to the detected condition.

6. An object taking-out apparatus according to any one of claims 4 through 5, wherein said visual sensor has image capturing means attached to the distal end of the robot arm through a slider mechanism movable in directions away from and toward the distal end of the robot arm, and said image capturing means is moved in the direction away from the distal end of the robot arm when capturing an image, and moved in the direction toward the distal end of the robot arm when said holding means holds the object.

7. An object taking-out apparatus for taking out an object, using a robot having a robot arm, comprising:
   a hand attached to a distal end of the robot arm;
   holding means provided at said hand, for holding an object; and
   a visual sensor for detecting condition of overlapping of objects,
   wherein a holding position of the object by said holding means is changed according to the detected condition, and
   wherein a center of holding by said holding means is offset from a center axis of a proximal portion thereof and a predetermined angle not equal to zero degrees is formed between a direction of a holding axis of said holding means and a rotational axis of the distal end of the robot arm.

8. An object taking-out apparatus according to claim 7, wherein said visual sensor has image capturing means attached to the distal end of the robot arm through a slider mechanism movable in directions away from and toward the distal end of the robot arm, and said image capturing means is moved in the direction away from the distal end of the robot arm when capturing an image, and moved in the direction toward the distal end of the robot arm when said holding means holds the object.

9. An object taking-out apparatus according to claim 7, further comprising a visual sensor having image capturing means attached to the distal end of the robot arm through a slider mechanism movable in directions away from and close to the distal end of the robot arm,
   wherein said image capturing means is moved in the direction away from the distal end of the robot arm when capturing an image, and moved in the direction toward the distal end of the robot arm when said holding means holds the object.

* * * * *